US012665648B2

(12) United States Patent
Thakur et al.

(10) Patent No.: US 12,665,648 B2
(45) Date of Patent: Jun. 23, 2026

(54) REPORTING OF A BEAM INDEX IN A COMMUNICATIONS NETWORK

(71) Applicant: Telefonaktiebolaget LM Ericsson (publ), Stockholm (SE)

(72) Inventors: Rupesh Kumar Thakur, Lund (SE); Swapnil Jain, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/032,439

(22) PCT Filed: Oct. 22, 2020

(86) PCT No.: PCT/EP2020/079712
§ 371 (c)(1),
(2) Date: Apr. 18, 2023

(87) PCT Pub. No.: WO2022/083864
PCT Pub. Date: Apr. 28, 2022

(65) Prior Publication Data
US 2023/0412235 A1 Dec. 21, 2023

(51) Int. Cl.
*H04B 7/06* (2006.01)
*H04B 7/08* (2006.01)

(52) U.S. Cl.
CPC ......... *H04B 7/06952* (2023.05); *H04B 7/088* (2013.01)

(58) Field of Classification Search
CPC .............................. H04B 7/0695; H04B 7/088
See application file for complete search history.

(56) References Cited

U.S. PATENT DOCUMENTS

| | | | |
|---|---|---|---|
| 10,666,342 B1 | 5/2020 | Landis et al. | |
| 2019/0364492 A1* | 11/2019 | Azizi | H04W 48/16 |
| 2020/0275402 A1 | 8/2020 | Wuxian et al. | |

(Continued)

FOREIGN PATENT DOCUMENTS

WO 2018125686 A2 7/2018

OTHER PUBLICATIONS

"-tuple." Merriam-Webster.com Dictionary, Merriam-Webster, https://www.merriam-webster.com/dictionary/-tuple. Accessed Dec. 23, 2024.). (Year: 2024).*

(Continued)

*Primary Examiner* — Jaison Joseph
(74) *Attorney, Agent, or Firm* — Sage Patent Group

(57) ABSTRACT

A method for reporting a beam index by a wireless device including a controller, a beam predictor, and a radio transceiver. The method incudes obtaining an indication that the wireless device is to report a beam index to an access network node and obtaining the beam index from the beam predictor by providing information of current geographic position of the wireless device and current time as input to the beam predictor. The beam predictor is trained with tuples that associate at least different geographical positions and different points in time with different beam indices. The beam predictor predicts the beam index based on the current geographic position and the current time. The method includes wirelessly reporting, using the radio transceiver, the beam index as obtained from the beam predictor to the access network node.

13 Claims, 4 Drawing Sheets

(56) References Cited

U.S. PATENT DOCUMENTS

| | | | | |
|---|---|---|---|---|
| 2020/0358514 | A1* | 11/2020 | Landis | G06N 3/088 |
| 2023/0155661 | A1* | 5/2023 | Landström | H04B 7/0695 |
| | | | | 375/262 |
| 2023/0412235 | A1* | 12/2023 | Thakur | H04B 7/088 |
| 2024/0039606 | A1* | 2/2024 | Bai | H04B 17/318 |

OTHER PUBLICATIONS

Merriam-Webster. (2003). Tuple. In Merriam-Webster's collegiate dictionary (10th ed., p. 1266). (Year: 1999).*

Merriam-Webster. (1998). Tuple. In Merriam-Websterâs collegiate dictionary (10th ed., p. 1266). (Year: 1999).*

PCT International Search Report and Written Opinion, mailed Apr. 28, 2022, for International Application No. PCT/EP2020/079712, 15 pages.

Ekman, Bjorn, "Machine Learning for Beam Based Mobility Optimization in NR," Master of Science Thesis in Communication Systems, Linköping University, 2017, 85 pages.

* cited by examiner

REPORTING OF A BEAM INDEX IN A COMMUNICATIONS NETWORK

CROSS-REFERENCE TO RELATED APPLICATIONS

This application is a 35 U.S.C § 371 national stage application for International Application No. PCT/EP2020/079712, entitled "REPORTING OF A BEAM INDEX IN A COMMUNICATIONS NETWORK", filed on Oct. 22, 2020, assigned to the assignee hereof, and expressly incorporated herein by reference.

TECHNICAL FIELD

Embodiments presented herein relate to a method, a wireless device, a computer program, and a computer program product for reporting a beam index.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the wireless devices might be required to reach a sufficient link budget.

Narrow beam transmission and reception schemes might be needed at such high frequencies to compensate the expected high propagation loss. For a given communication link, a respective beam can be applied at both the network-end (as represented by a network node or its transmission and reception point, TRP) and at the terminal-end (as represented by a wireless device), which typically is referred to as a beam pair link (BPL). A BPL (i.e. both the beam used by the network node and the beam used by the wireless device) is expected to be discovered and monitored by the network using measurements on downlink reference signals, such as channel state information reference signals (CSI-RS) or synchronization signal block (SSB) signals, used for beam management.

A beam management procedure can be used for discovery and maintenance of BPLs. In some aspects, the beam management procedure is defined in terms of a P-1 sub-procedure, a P-2 sub-procedure, and a P-3 sub-procedure.

The CSI-RS for beam management can be transmitted periodically, semi-persistently or aperiodically (event triggered) and they can be either shared between multiple wireless devices or be device-specific. The SSB are transmitted periodically and are shared for all wireless devices. In order for the wireless device to find a suitable network node beam, the network node, during the P-1 sub-procedure, transmits the reference signal in different transmission (TX) beams on which the wireless device performs measurements, such as reference signal received power (RSRP), and reports back the N best TX beams (where N can be configured by the network). Furthermore, the transmission of the reference signal on a given TX beam can be repeated to allow the wireless device to evaluate a suitable reception (RX) beam.

Reference signals that are shared between all wireless devices served by the TRP might be used to determine a first coarse direction for the wireless devices. It could be suitable for such a periodic TX beam sweep at the TRP to use SSB as the reference signal. One reason for this is that SSB are anyway transmitted periodically (for initial access/synchronization purposes) and SSBs are also expected to be beamformed at higher frequencies to overcome the higher propagation losses noted above.

A finer beam sweep in more narrow beams than used during the P-1 sub-procedure might then be performed at the network node during a P-2 sub-procedure to determine a more detailed direction for each wireless device. Here, the CSI-RS might be used as reference signal. As for the P-1 sub-procedure, the wireless device performs measurements, such as reference signal received power (RSRP), and reports back the N best TX beams (where N can be configured by the network).

Furthermore, the CSI-RS transmission in the transmission beam selected during the P-2 sub-procedure can be repeated in a P-3 sub-procedure to allow the wireless device to evaluate suitable RX beams at the wireless device.

It thus follows from the above that the wireless device needs to scan and measure all the beams during the P-1 sub-procedure as well as during the P-2 sub-procedure. The wireless then also has to report as many beams as configured by the network for the best beam to be selected. This could at least sometimes be an inefficient utilization of resources at both the wireless device (such as the need for utilizing uplink resources for sending reports to the network node, and the power for sending such reports) and the network node (such as the need for utilizing downlink resources for sending reference signals towards the wireless device, and the power for sending such reference signals).

Hence, there is still a need for a beam management procedure that correctly identifies the best beams but that does not waste resources.

SUMMARY

An object of embodiments herein is to enable correct identification of the best beams at low resource usage at the wireless device.

According to a first aspect there is presented a method for reporting a beam index. The method is performed by a wireless device. The wireless device comprises a controller, a beam predictor, and a radio transceiver. The method comprises obtaining, at the controller, an indication that the wireless device is to report a beam index to an access network node. The beam index represents a beam to be used by the access network node for communicating with the wireless device. The method comprises, in response thereto, obtaining, at the controller, the beam index from the beam predictor by providing information of current geographic position of the wireless device and current time as input to the beam predictor. The beam predictor has been trained with tuples that associate at least different geographical positions and different points in time with different beam indices. The beam predictor predicts the beam index based on the current geographic location and the current time. The method comprises wirelessly reporting, using the radio transceiver, the beam index as obtained from the beam predictor to the access network node.

According to a second aspect there is presented a wireless device for reporting a beam index. The wireless device comprises processing circuitry. The processing circuitry is configured to cause the wireless device to obtain an indication that the wireless device is to report a beam index to an access network node. The beam index represents a beam to be used by the access network node for communicating with the wireless device. The processing circuitry is configured to, in response thereto, obtain the beam index from a beam predictor by providing information of current geographic position of the wireless device and current time as input to the beam predictor. The beam predictor has been trained with tuples that associate at least different geographical positions and different points in time with different beam indices. The beam predictor predicts the beam index based on the current geographic location and the current time. The processing circuitry is configured to wirelessly report the beam index as obtained from the beam predictor to the access network node.

According to a third aspect there is presented a wireless device for reporting a beam index. The wireless device comprises a controller, a beam predictor, and a radio transceiver. The controller is configured to obtain an indication that the wireless device is to report a beam index to an access network node. The beam index represents a beam to be used by the access network node for communicating with the wireless device. The controller is configured to, in response thereto, obtain the beam index from the beam predictor by providing information of current geographic position of the wireless device and current time as input to the beam predictor. The beam predictor has been trained with tuples that associate at least different geographical positions and different points in time with different beam indices. The beam predictor predicts the beam index based on the current geographic location and the current time. The radio transceiver is configured to wirelessly report the beam index as obtained from the beam predictor to the access network node.

According to a fourth aspect there is presented a computer program for reporting a beam index, the computer program comprising computer program code which, when run on a wireless device, causes the wireless device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects can be used in a beam management procedure in order to correctly identify the best beams without wasting resources.

Advantageously, according to these aspects, the best beams can be identified whilst still avoiding unnecessary measurements to be performed by the wireless device.

Advantageously, these aspects enable resource efficient beam selection at the wireless device, resulting in lowered power consumption at the wireless device.

Advantageously, these aspects can lead to avoidance of the wireless device ping-ponging between beams.

Advantageously, pattern recognition algorithms can be used at the wireless device to enhance the prediction of the best beam.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
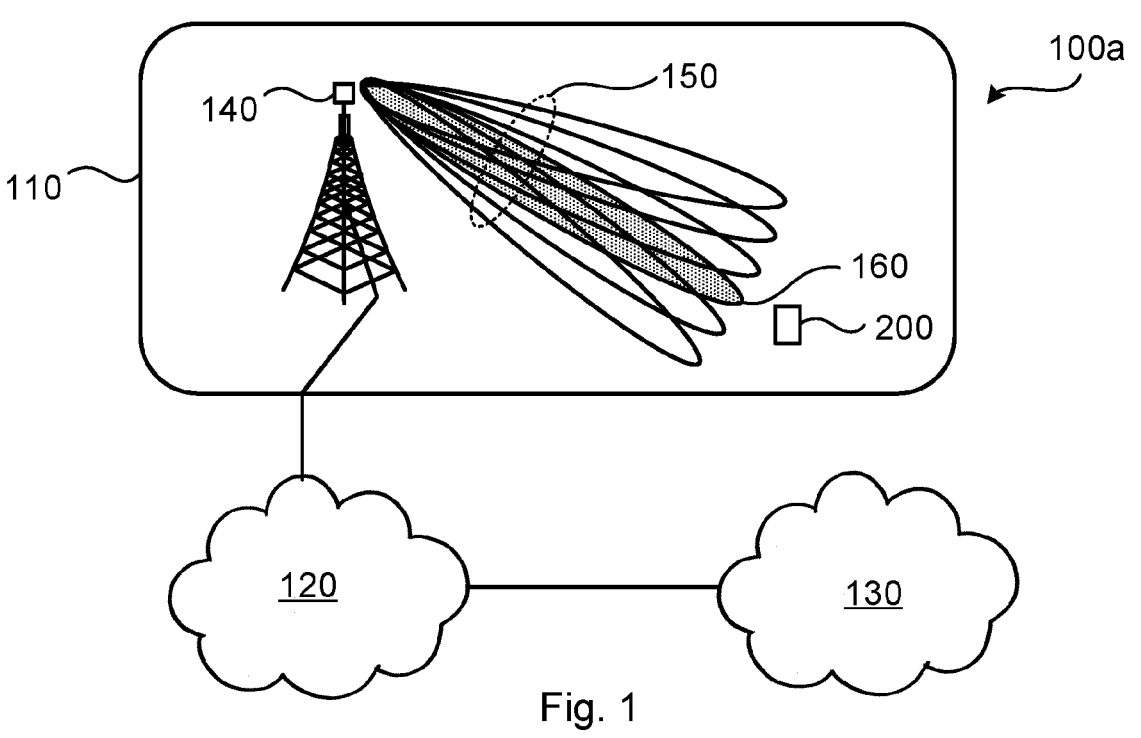
FIG. 1 and FIG. 2 are schematic diagrams illustrating communications networks according to embodiments.

FIG. 1 is a schematic diagram illustrating a communications network 100a where embodiments presented herein can be applied. The communications network 100a could be a third generation (3G) telecommunications network, a fourth generation (4G) telecommunications network, a fifth generation (5G) telecommunications network, or any evolvement thereof, and support any 3GPP telecommunications standard, where applicable.

The communications network 100a comprises a (radio) access network node 140 configured to provide network access to wireless devices, as represented by wireless device 200, in a radio access network 110. The radio access network 110 is operatively connected to a core network 120. The core network 120 is in turn operatively connected to a service network 130, such as the Internet. The wireless device 200 is thereby enabled to, via the access network node 140, access services of, and exchange data with, the service network 130.

The access network node 140 comprises, is collocated with, is integrated with, or is in operational communications with, a transmission and reception point (TRP). The access network node 140 (via its TRP) and the wireless device 200 are configured to communicate with each other in beams 150. The currently used beam is indicated at reference numeral 160 whereas the remaining beams are referred to as candidate beams. In this respect, beams that could be used both as TX beams and RX beams will hereinafter simply be referred to as beams.

Examples of access network node 140 are, radio base stations, base transceiver stations, Node Bs, evolved Node Bs, g NBs, access points, access nodes, and integrated access an backhaul nodes. Examples of wireless devices 200 are terminal devices, mobile stations, mobile phones, handsets, wireless local loop phones, user equipment (UE), smartphones, laptop computers, tablet computers, network equipped sensors, network equipped vehicles, wearable electronic devices, and so-called Internet of Things devices.

As noted above there is still a need for a beam management procedure that correctly identifies the best beams but that does not waste resources. Since the wireless device 200 typically has stricter requirements on the use of power (e.g. by being battery powered), waste of resources should be avoided at the wireless device 200.

Figure 2:
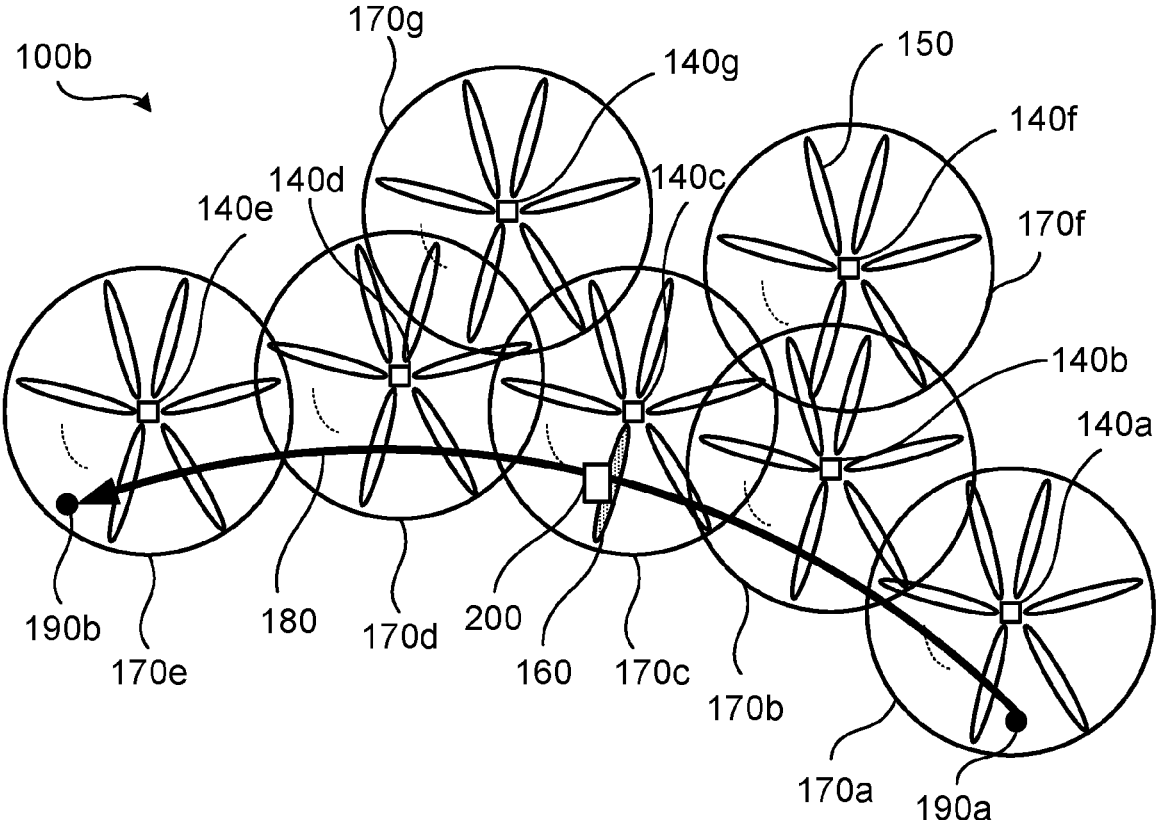

In more detail, the wireless device 200 will scan and measure on beams that, for a specific geographic location and time of the day, might never be the best beam. As an illustrative example, assume that the access network node 110 generates twelve beams with beam ID 1-12, and at a certain geographic location the wireless device 200 finds the beam with beam ID 4 always to be the best beam. Still, the wireless device 200 will always try to measure on the remaining eleven beams and thus wastes critical resources. This is illustrated in FIG. 2. FIG. 2 schematically illustrates a communications network 100b. The communications network 100b is similar to that of FIG. 1, but in FIG. 2 multiple access network nodes 140a:140g are illustrated and the radio access network 140 of FIG. 1 is instead represented by individual cells 170a:170g of the access network nodes 140a:140g. Further, to avoid cluttering, the core network 120 and the service network 130 are not illustrated in FIG. 2, only some of the beams are illustrated, and only one of the beams is provided with reference numeral 150. In the illustrative example of FIG. 2, the wireless device 200 is moved along a path 180 from a source location 190a to a target location 190b. When being moved, the wireless device 200 will in turn be served in beams by access network node 140a, access network node 140b, access network node 140c, access network node 140d, and access network node 140e (in that particular order). As in FIG. 1, the currently used beam is indicated at reference numeral 160.

In a traditional approach the wireless device 200 continuously scans and measures on reference signals in all the beams as received from the access network nodes 140a:140e and reports the best beams (one for each particular geographical location and time of the day) to the access network nodes 140a:140e as the wireless devices 200 is moved along the path 180. This procedure is first performed for access network node 140a, then for access network node 140b, and so on until the target location 190b is reached.

Assume now that the wireless device 200 will follow the same path 180 at (almost) the same time every day. The wireless device 200 might then observe that most of the time a particular beam ID is selected as best beam at an approximately similar location and time every day. When properly trained, the wireless device 200 might accurately predict the best beam out of many beams covering the geographical area at that time.

The embodiments disclosed herein thereby address issues of inefficient utilization of resources at the wireless device 200 when participating in the beam management procedure with the access network node 140.

As will be further disclosed below, any beam index selected based on scans and measurements on reference signals for a geographical location and time of day will be fed as input to training of a beam predictor in the wireless device 200. Once the training has reached a maturity level, the wireless device does not need to scan and measure on all the beams 150 but can instead predict and report the beam index of the best beam.

For example, if the wireless device 200 is served by the access network node 140a when located at a certain geographical location and time of the day, the beam predictor might have learned that the beam with beam index 2 is the best beam and so this beam index is predicted and reported as best beam by the wireless device 200. The same applies as the wireless device 200 is moved and in turn served by access network nodes 140b, 140c, 140d, 140e; the beam index of the best beam for each given geographical location and time of the day is predicted and can be reported without any measurements being made, thus saving resources at the wireless device 200.

The embodiments disclosed herein in particular relate to mechanisms for reporting a beam index. In order to obtain such mechanisms there is provided a wireless device 200, a method performed by the wireless device 200, a computer program product comprising code, for example in the form of a computer program, that when run on a wireless device 200, causes the wireless device 200 to perform the method.

Figure 3:
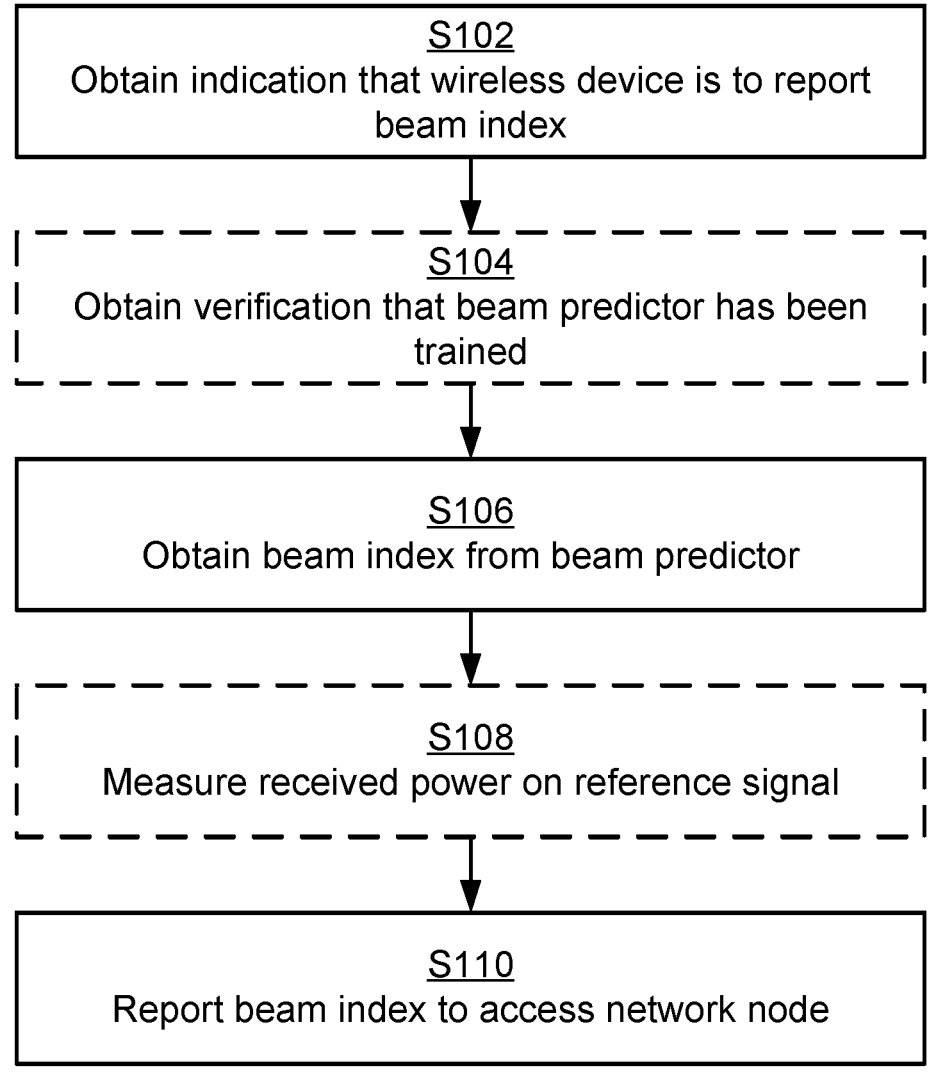
FIG. 3 and FIG. 4 are flowcharts of methods according to embodiments.

FIG. 3 is a flowchart illustrating embodiments of methods for reporting a beam index. The methods are performed by the wireless device 200. The methods are advantageously provided as computer programs 720. The wireless device 200 comprises a controller 240, a beam predictor 250, and a radio transceiver 260.

S102: An indication is obtained, at the controller 240, that the wireless device 200 is to report a beam index to an access network node 140. The beam index represents a beam 160 to be used by the access network node 140 for communicating with the wireless device 200.

S106: The beam index is, in response thereto, obtained at the controller 240. The beam index is obtained from the beam predictor 250 by the controller 240 providing information of current geographic position of the wireless device 200 and current time as input to the beam predictor 250. The beam predictor 250 has been trained with tuples that associate at least different geographical positions and different points in time with different beam indices. The beam predictor 250 predicts the beam index based on the current geographic location and the current time.

S110: The radio transceiver 260 wirelessly reports the beam index, as obtained from the beam predictor 250, to the access network node 140.

Advantageously, this method can be used in a beam management procedure in order to correctly identify the best beams without wasting resources.

Advantageously, according to this method, the best beams can be identified whilst still avoiding unnecessary measurements to be performed by the wireless device 200.

Advantageously, this method enables resource efficient beam selection at the wireless device 200, resulting in lowered power consumption at the wireless device 200.

Advantageously, this method can lead to avoidance of the wireless device 200 ping-ponging between different beams 150.

Advantageously, and as will be further disclosed below, pattern recognition algorithms can be used at the wireless device 200 to enhance the prediction of the best beam.

Embodiments relating to further details of reporting a beam index as performed by the wireless device 200 will now be disclosed.

Aspects relating to the reporting of the beam index and when in time the wireless device 200 is to report the beam index will now be disclosed.

In some aspects, the indication as obtained in step S102 is defined by the wireless device 200 being at particular location at particular time of day. That is, in some embodiments, the indication as obtained specifies the current time and that the wireless device 200 is located at the current geographic position. The wireless device 200 might then automatically report the beam index, without being prompted to do so by the access network node 140.

In some aspects, the indication as obtained in step S102 is defined by the wireless device 200 receiving (via the radio transceiver 260) reference signals, such as CSI-RS or SSB, from the access network node 140. That is, in some embodiments, the indication is obtained at the controller 240 from the radio transceiver 260 upon the radio transceiver 260 having received a reference signal from the access network node 140. The wireless device 200 might then scan and measure on the reference signal of only the beam index that is suggested by the beam predictor 250. In particular, in some embodiments, the wireless device 200 is configured to perform (optional) step S108:

S108: The wireless device 200 measures received power on the reference signal only as received in the beam 160 given by the beam index.

The signal strength value, corresponding to the measures received power, might then be reported to the access network node 140 together with the beam index.

However, in other aspects, the wireless device 200 does not perform any scan and does not measure on the reference signal of the beam index. Instead, the wireless device 200 might predict the signal strength value. In some embodiments, the tuples associate the different geographical positions and different points in time also with a signal strength value for a respective beam 160 of the different beam indices. The beam predictor 250 might then be configured to predict the signal strength value for the beam 160 of the beam index. The signal strength value as predicted might then be reported to the access network node 140 together with the beam index.

Further, if the signal strength (obtained either via measurements or via prediction) is below a signal strength threshold value, then the wireless device 200 might report two or more best beams. For notational purposes, the beam index is a first beam index, and the tuples might associate the different geographical positions and different points in time also with a signal strength value for a respective beam 160 of the different beam indices. In some embodiments, also a second beam index is predicted by the beam predictor 250 based on the current geographic location and the current time and reported by the radio transceiver 260 to the access network node 140 when the signal strength value for the beam 160 of the first beam index is below a threshold value.

Aspects relating to the beam predictor 250 will now be disclosed.

In some aspects it is verified that the beam predictor 250 has been properly trained before input is provided to the beam predictor 250. Particularly, in some embodiments, the wireless device 200 is configured to perform (optional) step S104:

S104: The controller 240 obtains verification from the beam predictor 250 that the beam predictor 250 has been trained before the information of current geographic position of the wireless device 200 and current time is provided as input to the beam predictor 250.

In some aspects, the beam predictor 250 utilizes also other parameters than those mentioned above for predicting the beam index. In particular, in some non-limiting examples, the beam index is by the beam predictor 250 predicated also based on at least one of: predicted geographic position towards which the wireless device 200 is moving, physical cell identity (PCI) of the access network node 140, current travelling speed of the wireless device 200, timing advance (TA) information of communication between the wireless device 200 and the access network node 140.

Aspects relating to training of the beam predictor 250 will now be disclosed.

In general terms, machine learning can be used at the wireless device 200 for the beam predictor 250 to accurately predict the beam index. The input vectors for the machine learning could be composed of the same parameters that are utilized by the beam predictor 250 for predicting the beam index. In some non-limiting examples, training of the beam predictor 250 is based on measurements on reference signals as previously received by the radio transceiver 260. In further non-limiting examples, training of the beam predictor 250 is based on at least one of: PCI of the access network node 140, current geographic position of the wireless device 200, predicted geographic position towards which the wireless device 200 is moving, current travelling speed of the wireless device 200, time of day, TA information of communication between the wireless device 200 and the access network node 140. In yet further non-limiting examples, training of the beam predictor 250 is based on feedback in terms of any of: packet loss per beam 160 used for communication between the wireless device 200 and the access network node 140, radio link failure indications per beam 160 used for communication between the wireless device 200 and the access network node 140, amount of retransmissions per beam 160 used for communication between the wireless device 200 and the access network node 140. In some non-limiting examples, training of the beam predictor 250 involves comparing quantities as obtained from feedback to corresponding quantities as predicted by the beam predictor 250. For example, the beam predictor 250 could be trained by comparing signal strength values obtained from actual measurements on reference signals to predicted signal strength values. Such comparisons could act as validation that the predictions made by the beam predictor 250 are accurate.

In some embodiments, training of the beam predictor 250 is based on running pattern recognition on observations of which beam indices that, based on measurements on received reference signals, have been reported by the radio transceiver 260 for different combinations of geographical positions and points in time.

Training of the beam predictor 250 could be based on classification techniques such as trees, neural networks, k-nearest neighbors (KNN) algorithm, support vector machine (SVM), logistic regression, etc. In supervised machine learning the above-mentioned parameters will be used for training of the beam predictor 250 with different possible combinations of time of the day, geographic location and other inputs. This will produce a model that will output the beam index of the beam to be selected.

Figure 4:
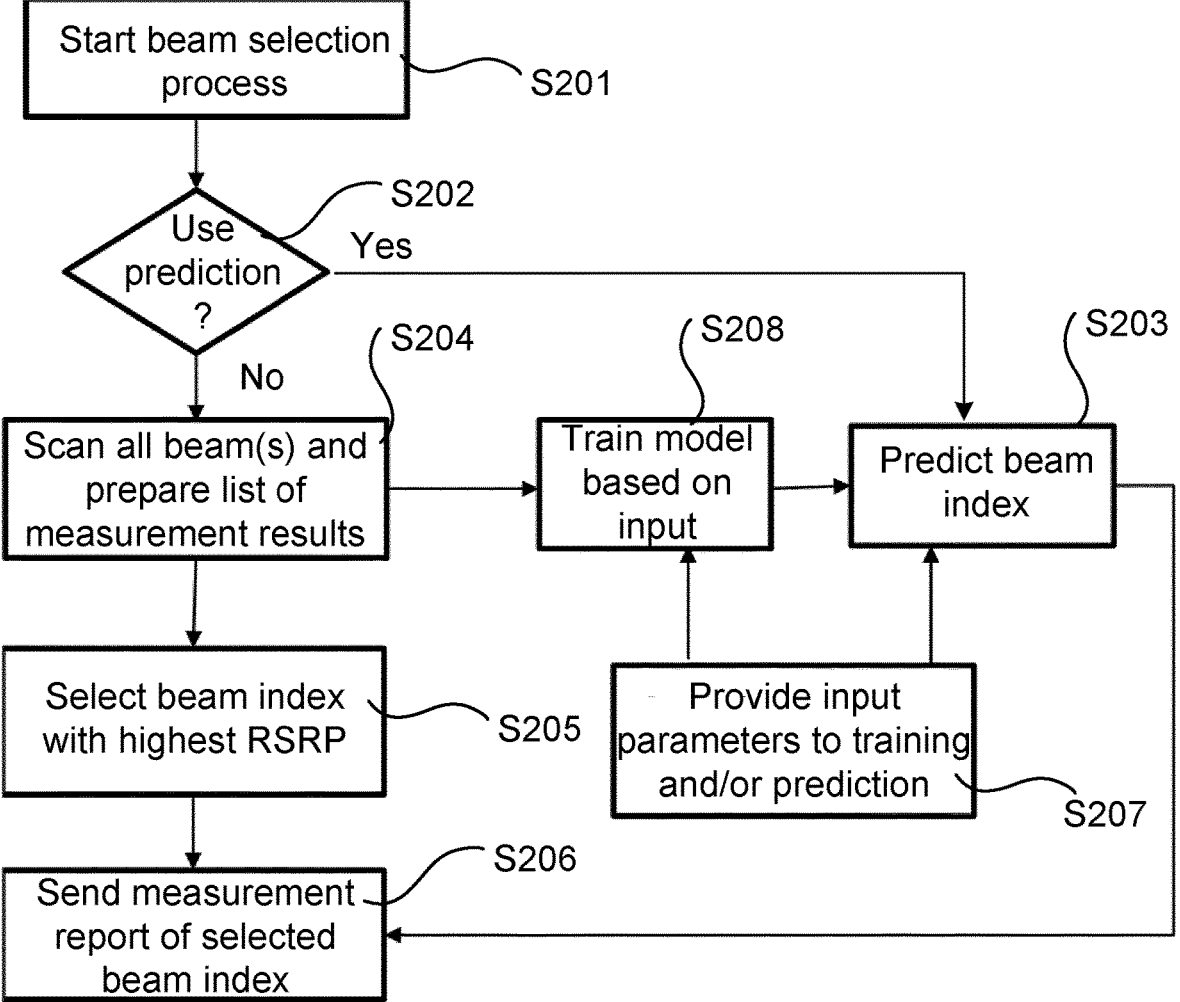

One particular embodiment for reporting a beam index as performed by the wireless device 200 based on at least some of the above disclosed embodiments will now be disclosed with reference to the flowchart of FIG. 4.

S201: The beam selection procedure is started by the wireless device 200 obtaining an indication that the wireless device 200 is to report a beam index to the access network node 140.

S202: It is checked whether the beam index is to be determined using prediction or not. If prediction is to be used, step S203 is entered. Else step S204 is entered. Step S204 could for example be entered if it cannot be verified that the beam predictor 250 has been trained.

S203: The beam index is determined using prediction. The beam index is then obtained as in step S106.

S204: The wireless device 200 scans and measures on reference signals transmitted by the access network node 140 in beams 150. The wireless device 200 then prepares a list of the measurements and also includes other parameters in the list, such as information of current geographic position of the wireless device 200 and current time, and optionally geographic position towards which the wireless device 200 is moving, PCI of the access network node 140, current travelling speed of the wireless device 200, TA information of communication between the wireless device 200 and the access network node 140. The list of measurements as prepared in step S204 is also provided as input to training of the beam predictor 250.

S205: The beam index of the beam with highest received power according to the scanning and measuring on reference signals in step S204 is selected.

S206: The wireless devices 200 wirelessly reports, using the radio transceiver 260, the beam index as obtained either from the beam predictor 250 in step S203 or from the scanning and measuring on reference signals in step S204 to the access network node 140.

S207: Possible further parameters (for example defined by the above disclosed feedback) are provided for training of the beam predictor 250 (as in step S208) and/or for making actual predictions by the beam predictor 250 (as in step S203).

S208: The beam predictor 250 is trained based on the input provided in step S204 and step S207.

Figure 5:
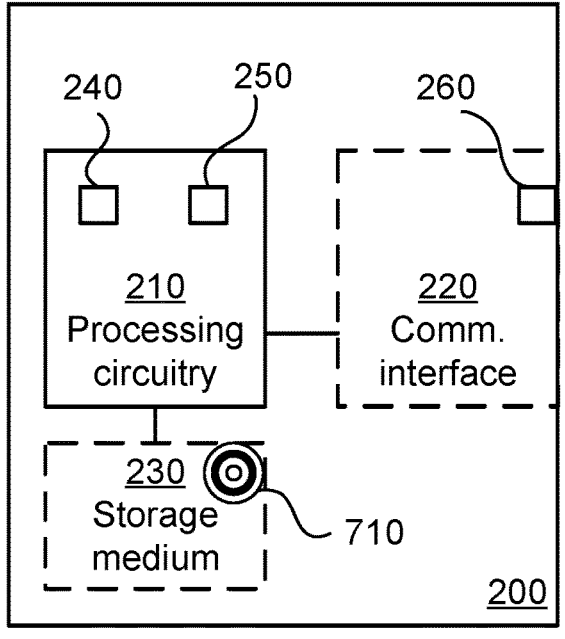
FIG. 5 is a schematic diagram showing functional units of a wireless device according to an embodiment.

FIG. 5 schematically illustrates, in terms of a number of functional units, the components of a wireless device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 230. The processing circuitry 210 may further be provided as at least one application specific integrated circuit (ASIC), or field programmable gate array (FPGA).

Particularly, the processing circuitry 210 is configured to cause the wireless device 200 to perform a set of operations, or steps, as disclosed above. In some aspects, the processing circuitry 210 implements the functionality of the controller 240 and the beam predictor 250. For example, the storage medium 230 may store the set of operations, and the processing circuitry 210 may be configured to retrieve the set of operations from the storage medium 230 to cause wireless device 200 to perform the set of operations. The set of operations may be provided as a set of executable instructions. Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory.

The wireless device 200 may further comprise a communications interface 220 at least configured for communications at least with the access network node 140. In some aspects, the communications interface 220 implements the functionality of the radio transceiver 260. As such the communications interface 220 may comprise one or more transmitters and receivers, comprising analogue and digital components. The processing circuitry 210 controls the general operation of the wireless device 200 e.g. by sending data and control signals to the communications interface 220 and the storage medium 230, by receiving data and reports from the communications interface 220, and by retrieving data and instructions from the storage medium 230. Other components, as well as the related functionality, of the wireless device 200 are omitted in order not to obscure the concepts presented herein.

Figure 6:
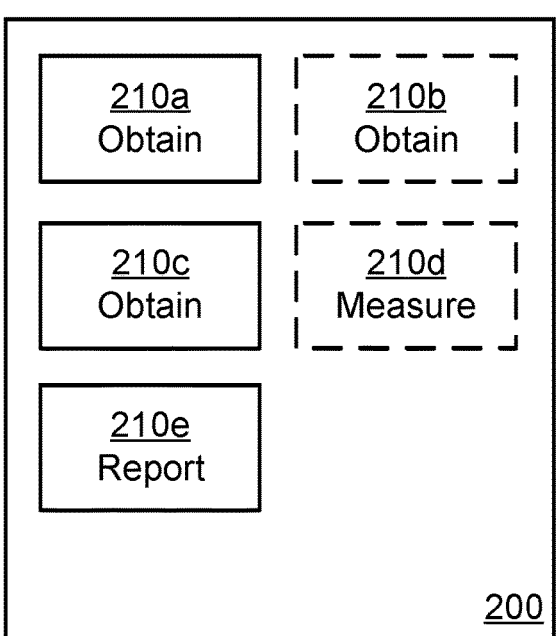
FIG. 6 is a schematic diagram showing functional modules of a wireless device according to an embodiment.

FIG. 6 schematically illustrates, in terms of a number of functional modules, the components of a wireless device 200 according to an embodiment. The wireless device 200 of FIG. 6 comprises a number of functional modules; an obtain module 210a configured to perform step S102, an obtain module 210c configured to perform step S106, and a report module 210l configured to perform step S110. The wireless device 200 of FIG. 6 may further comprise a number of optional functional modules, such as any of an obtain module 210b configured to perform step S104 and/or a measure module 210d configured to perform step S108. In general terms, each functional module 210a:210e may in one embodiment be implemented only in hardware and in another embodiment with the help of software, i.e., the latter embodiment having computer program instructions stored on the storage medium 230 which when run on the processing circuitry makes the wireless device 200 perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210a:210e may be implemented by the processing circuitry 210, possibly in cooperation with the communications interface 220 and/or the storage medium 230. The processing circuitry 210 may thus be configured to from the storage medium 230 fetch instructions as provided by a functional module 210a:210e and to execute these instructions, thereby performing any steps as disclosed herein.

Examples of wireless device 200 have been provided above.

Figure 7:
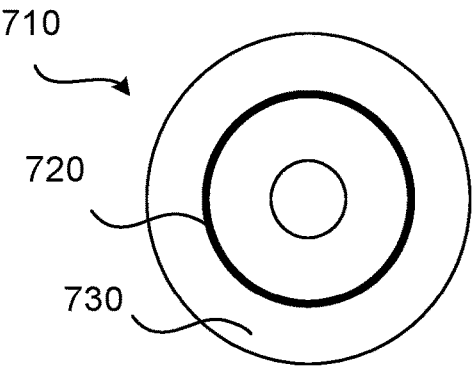
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 210 and thereto operatively coupled entities and devices, such as the communications interface 220 and the storage medium 230, to execute methods according to embodiments described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for reporting a beam index, the method being performed by a wireless device, the wireless device comprising a controller, a beam predictor, and a radio transceiver, the method comprising:

obtaining, at the controller, an indication that the wireless device is to report the beam index to an access network node, wherein the beam index represents a beam to be used by the access network node for communicating with the wireless device; and in response thereto:

obtaining, at the controller, the beam index from the beam predictor by providing information of current geographic position of the wireless device and current time as input to the beam predictor, wherein the beam predictor has been trained with tuples that associate at least different geographical positions and different points in time with different beam indices, and wherein the beam predictor predicts the beam index based on the current geographic position and the current time and wherein a second beam index is predicted and reported by the radio transceiver to the access network node when the signal strength value for the beam is below a threshold value;

obtaining, by the controller, verification from the beam predictor that the beam predictor has been trained before the information of the current geographic position of the wireless device and the current time is provided as input to the beam predictor, and wirelessly reporting, using the radio transceiver, the beam index as obtained from the beam predictor to the access network node, wherein the tuples associate the different geographical positions and the different points in time with a signal strength value for a respective beam of the different beam indices.

2. The method according to claim 1, wherein the indication as obtained specifies the current time and that the wireless device is located at the current geographic position.

3. The method according to claim 1, wherein the indication is obtained at the controller from the radio transceiver upon the radio transceiver having received a reference signal from the access network node.

4. The method according to claim 3, further comprising: measuring received power on the reference signal only as received in the beam given by the beam index.

5. The method according to claim 1, wherein the beam predictor predicts the signal strength value for the beam of the beam index, and wherein the signal strength value is reported to the access network node together with the beam index.

6. The method according to claim 1, wherein the beam index is a first beam index and wherein the tuples associate the different geographical positions and the different points in time also with a signal strength value for a respective beam of the different beam indices.

7. The method according to claim 1, wherein the beam index is predicted by the beam predictor based on at least one of: predicted geographic position towards which the wireless device is moving, physical cell identity (PCI) of the access network node, current travelling speed of the wireless device, or timing advance information of communication between the wireless device and the access network node.

8. The method according to claim 1, wherein training of the beam predictor is based on measurements on reference signals as previously received by the radio transceiver.

9. The method according to claim 1, wherein training of the beam predictor is based on at least one of: physical cell identity (PCI) of the access network node, the current geographic position of the wireless device, predicted geographic position towards which the wireless device is moving, current travelling speed of the wireless device, time of day, or timing advance information of communication between the wireless device and the access network node.

10. The method according to claim 1, wherein training of the beam predictor is based on feedback in terms of one of: packet loss per beam used for communication between the wireless device and the access network node, radio link failure indications per beam used for communication between the wireless device and the access network node, or amount of retransmissions per beam used for communication between the wireless device and the access network node.

11. The method according to claim 1, wherein training of the beam predictor is based on running pattern recognition on observations of which beam indices that, based on measurements on received reference signals, have been reported by the radio transceiver for different combinations of geographical positions and points in time.

12. A wireless device for reporting a beam index, the wireless device comprising processing circuitry, the processing circuitry being configured to cause the wireless device to:

obtain an indication that the wireless device is to report the beam index to an access network node, wherein the beam index represents a beam to be used by the access network node for communicating with the wireless device; and in response thereto:

obtain the beam index from a beam predictor by providing information of current geographic position of the wireless device and current time as input to the beam predictor, wherein the beam predictor has been trained with tuples that associate at least different geographical positions and different points in time with different beam indices, and wherein the beam predictor predicts the beam index based on the current geographic position and the current time and wherein a second beam index is predicted and reported by the radio transceiver to the access network node when the signal strength value for the beam is below a threshold value; obtaining, by the controller, verification from the beam predictor that the beam predictor has been trained before the information of the current geographic position of the wireless device and the current time is provided as input to the beam predictor, and wirelessly report the beam index as obtained from the beam predictor to the access network node, wherein the tuples associate the different geographical positions and the different points in time with a signal strength value for a respective beam of the different beam indices.

13. A non-transitory computer-readable medium having stored thereon computer-executable instructions that, when executed by a computer, cause the computer to execute operations, the operations comprising:

obtain an indication that the wireless device is to report the beam index to an access network node, wherein the beam index represents a beam to be used by the access network node for communicating with the wireless device; and in response thereto:

obtain the beam index from a beam predictor by providing information of current geographic position of the wireless device and current time as input to the beam predictor, wherein the beam predictor has been trained with tuples that associate at least different geographical positions and different points in time with different beam indices, and wherein the beam predictor predicts the beam index based on the current geographic position and the current time and wherein a second beam index is predicted and reported by the radio transceiver to the access network node when the signal strength value for the beam is below a threshold value; obtaining, by the controller, verification from the beam predictor that the beam predictor has been trained before the information of the current geographic position of the wireless device and the current time is provided as input to the beam predictor, and wirelessly report the beam index as obtained from the beam predictor to the access network node, wherein the tuples associate the different geographical positions and the different points in time with a signal strength value for a respective beam of the different beam indices.

* * * * *